United States Patent [19]

Raynham

[11] 3,750,105

[45] July 31, 1973

[54] DATA ENTRY AND DISPLAY APPARATUS

[75] Inventor: Michael B. Raynham, San Jose, Calif.

[73] Assignee: Hewlitt-Packard Company, Palo Alto, Calif.

[22] Filed: Feb. 14, 1972

[21] Appl. No.: 226,251

[52] U.S. Cl. .......................................... 340/172.5

[51] Int. Cl. .......................................... G06f 3/14

[58] Field of Search .......................................... 340/172.5

[56] References Cited

UNITED STATES PATENTS

| | | | |
|---|---|---|---|
| 3,544,971 | 12/1970 | Looschen | 340/172.5 |
| 3,156,815 | 11/1964 | Smeltzer | 340/172.5 |
| 3,045,211 | 7/1962 | Auerbach | 340/172.5 |
| 3,564,510 | 2/1971 | Bagley et al. | 340/172.5 |
| 3,579,198 | 5/1971 | Giunta | 340/172.5 |
| 3,428,793 | 2/1969 | Scuitto | 340/172.5 |

*Primary Examiner*—Gareth D. Shaw
*Attorney*—A. C. Smith

[57] ABSTRACT

A display register and two-bit shift registers for each of a plurality of register-selecting switches are provided in addition to conventional storage registers in a computer for temporarily displaying and manipulating data thus displayed prior to its transfer into a selected register.

3 Claims, 8 Drawing Figures

A,B,M, OR P (i.e. $N_1$) 'CURRENT SELECT' AND (DIFFERENT) A,B,M, OR P (i.e. $N_2$) NEWLY SELECTED: OPERATION

DATA ENTRY AND DISPLAY APPARATUS

BACKGROUND OF THE INVENTION

Certain known computers include banks of display lights that correspond to selected storage registers in the machine. The contents of these storage registers are displayed upon call in the associated bank of display lights by the operator actuating the switch associated with a selected storage register. With the storage register so accessed for display, the data in the register can then be modified using a switch per storage bit of the register. However, the original data contents of the register so accessed and modified are destroyed and are not thereafter recallable for use, say, in checking a program, or in troubleshooting the operation of the computer, or the like. This requires that the original contents of the accessed register be recorded separately and then reentered when desired after completion of modifications. This conventional technique for displaying and entering data in selected storage registers greatly increases the time required to load the registers as in checking system operations, or the like. In addition, the banks of lights and switches required for displaying and entering data in several storage registers requires an amount of panel area that is not readily available on miniaturized computers.

SUMMARY OF THE INVENTION

Accordingly, the present invention uses a single bank of display lights and switches for displaying and modifying the contents of any one of a plurality of storage registers. Also, the contents of a register may be displayed and modified as desired without destroying the data originally stored in the accessed register. This permits instant recall and display of the original data without modifications so that experimental data for storage may be temporarily presented. The data so displayed whether as originally stored or as modified is then entered into the accessed register only upon selection of another register or function switch. Additionally, the memory circuits of a memory array may be accessed as storage registers in accordance with the present invention for improved versatility in the control and operation of a computer.

DESCRIPTION OF THE PREFERRED EMBODIMENT

Figure 1:
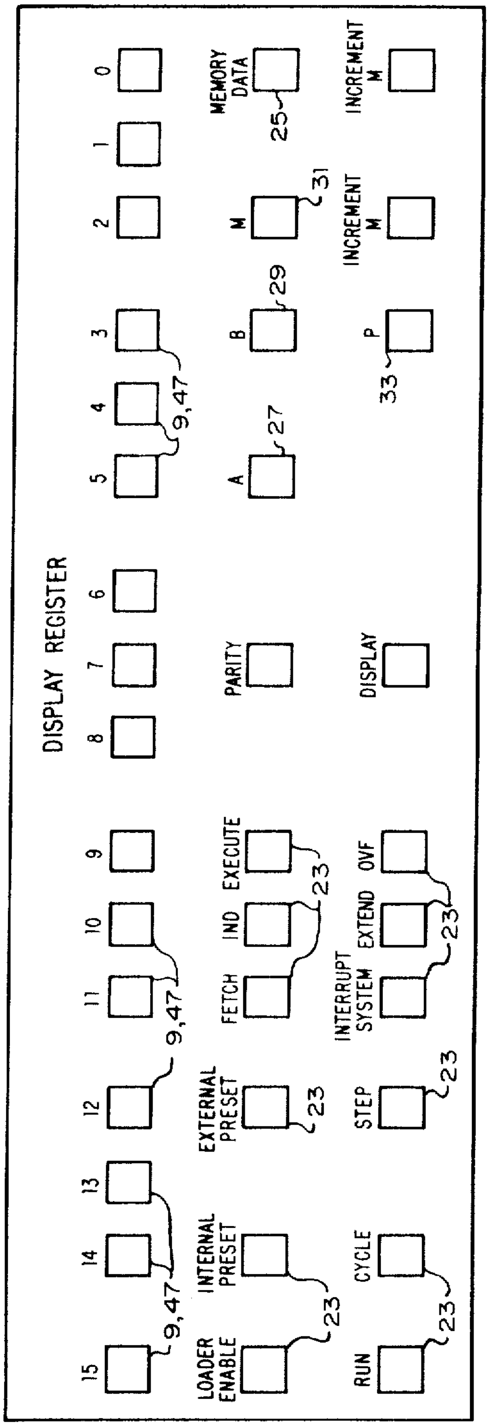
FIG. 1 is a pictorial diagram of the panel array of switches and indicators required for accessing, displaying and modifying data in a plurality of storage registers.

Referring now to the pictorial diagram of the panel array as shown in FIG. 1, there is shown a plurality of switches 9, say of pushbutton type, containing indicator lights that are lineally arranged in a bank which corresponds to a selected register, each switch and indicator light corresponding to a storage bit of a register. In addition, the panel array also includes indicators-switches 27, 29, 15, 31, 33 and 25 for accessing various storage registers of a computer or other logical data manipulating apparatus. The indicator-switch 31 for accessing the storage register M and the memory data indicator-switch 25 are provided to access a particular storage circuit in a stack of magnetic cores or other data storage elements, in a manner as described hereinafter. In addition, indicator-switches 23 may be provided to control certain operating functions of the associated computer.

Figure 2:
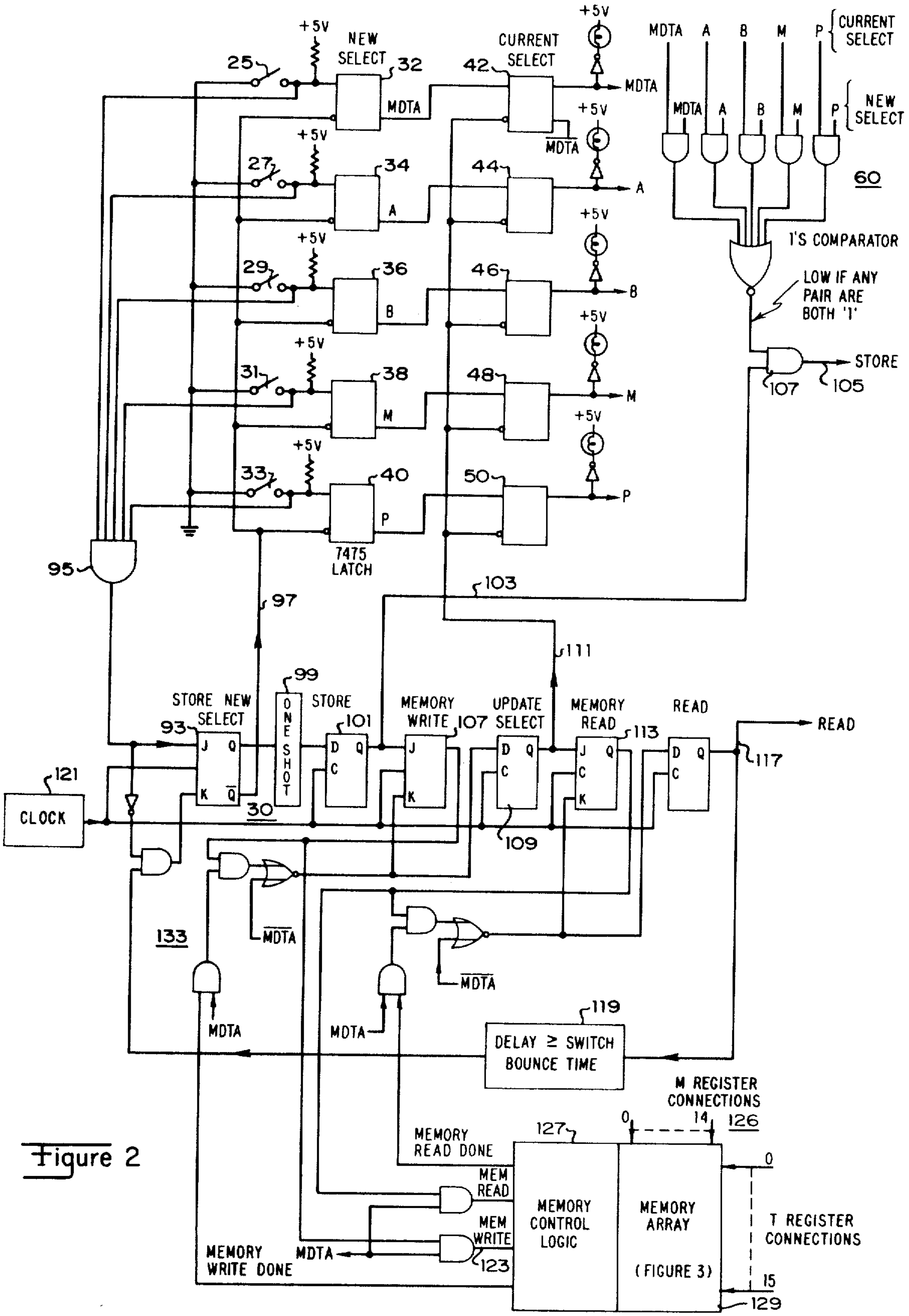
FIG. 2 is a schematic diagram of the circuitry associated with the switches and indicators shown in FIG. 1.
Figure 3:
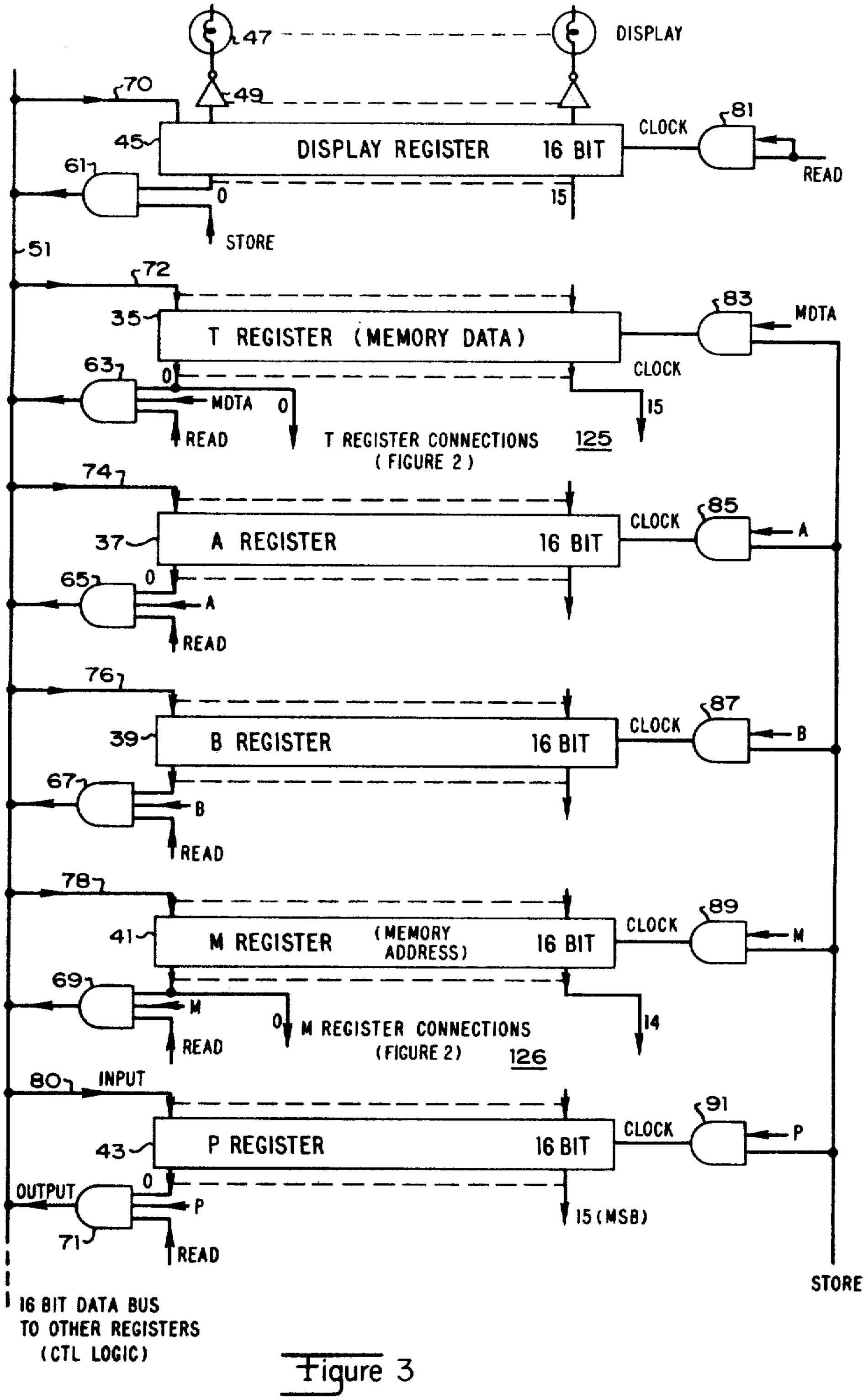
FIG. 3 is a schematic diagram of selected storage registers and associated gates for operation in accordance with the present invention.
Figure 4:
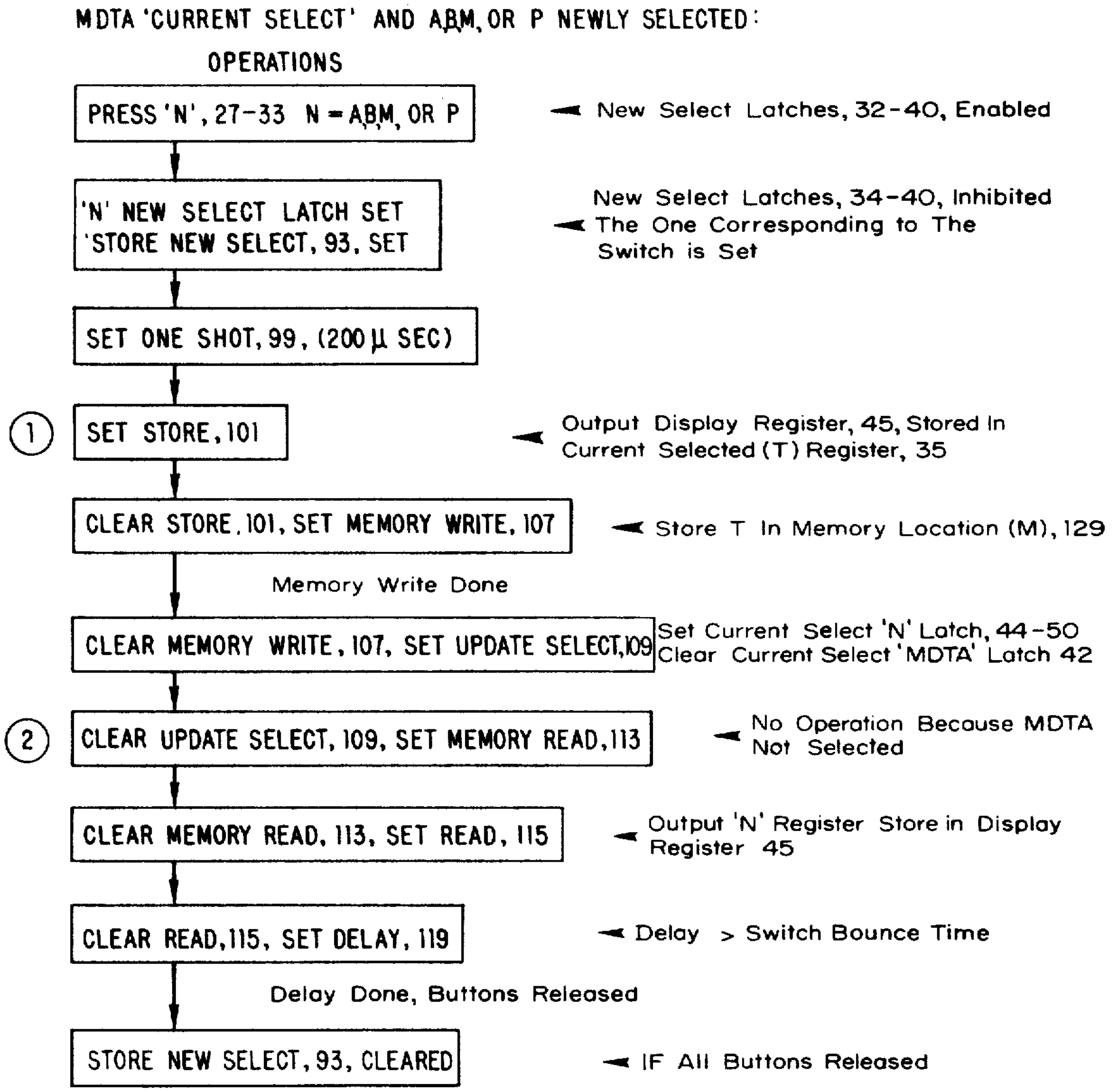
FIGS. 4 through 8 are operating-sequence diagrams for selected operating conditions of the present invention.
Figure 5:
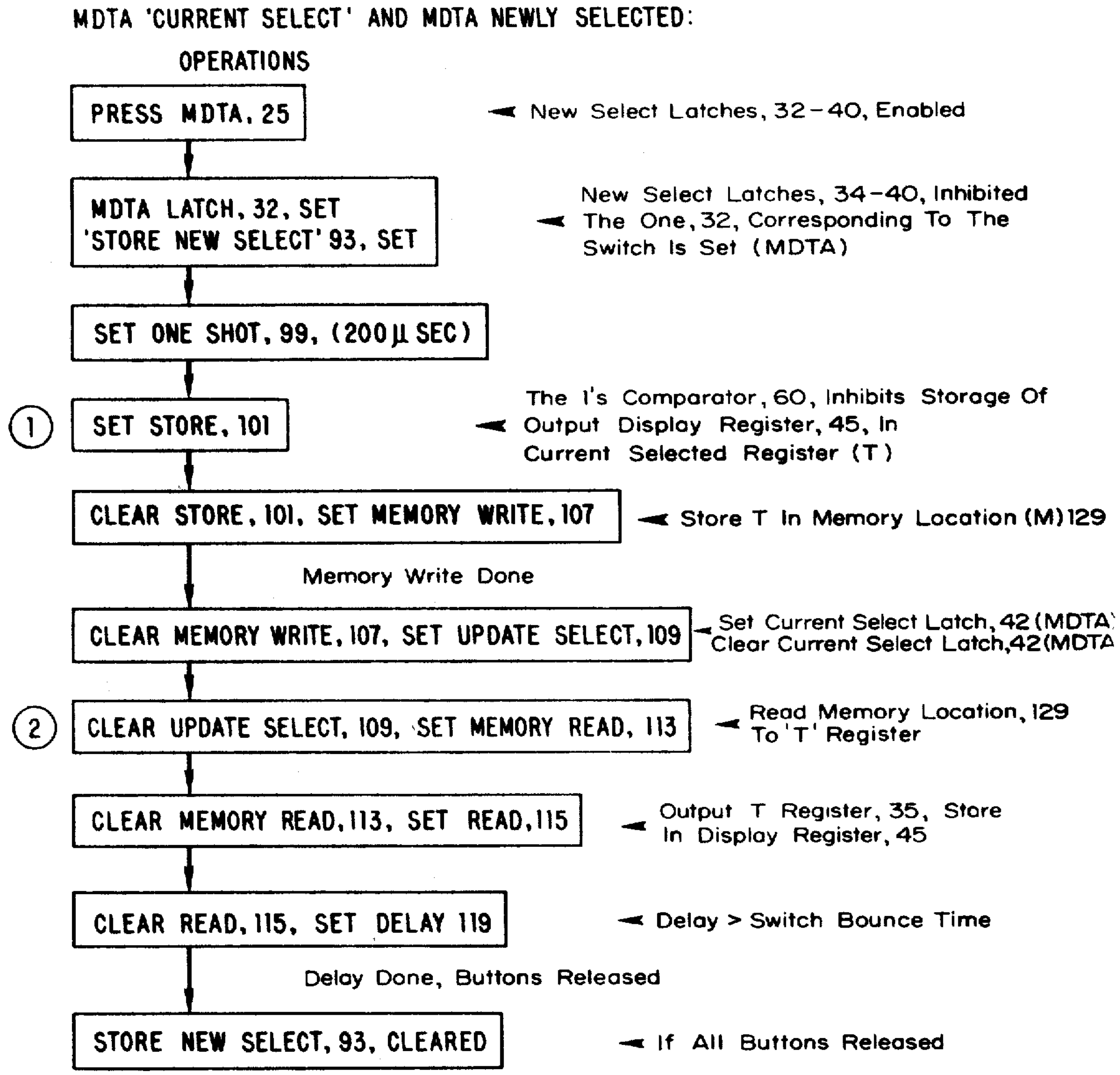
Figure 6:
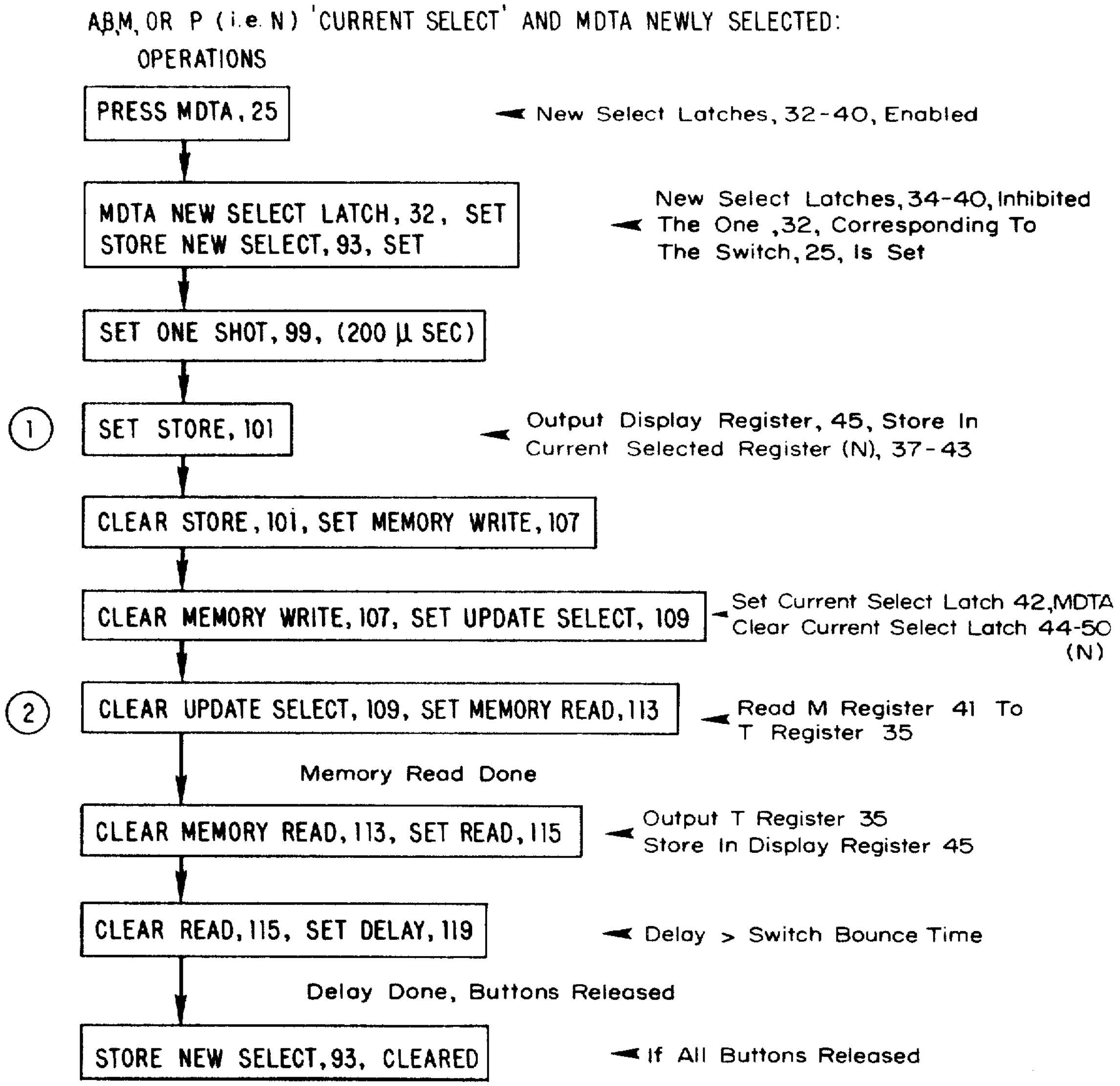
Figure 7:
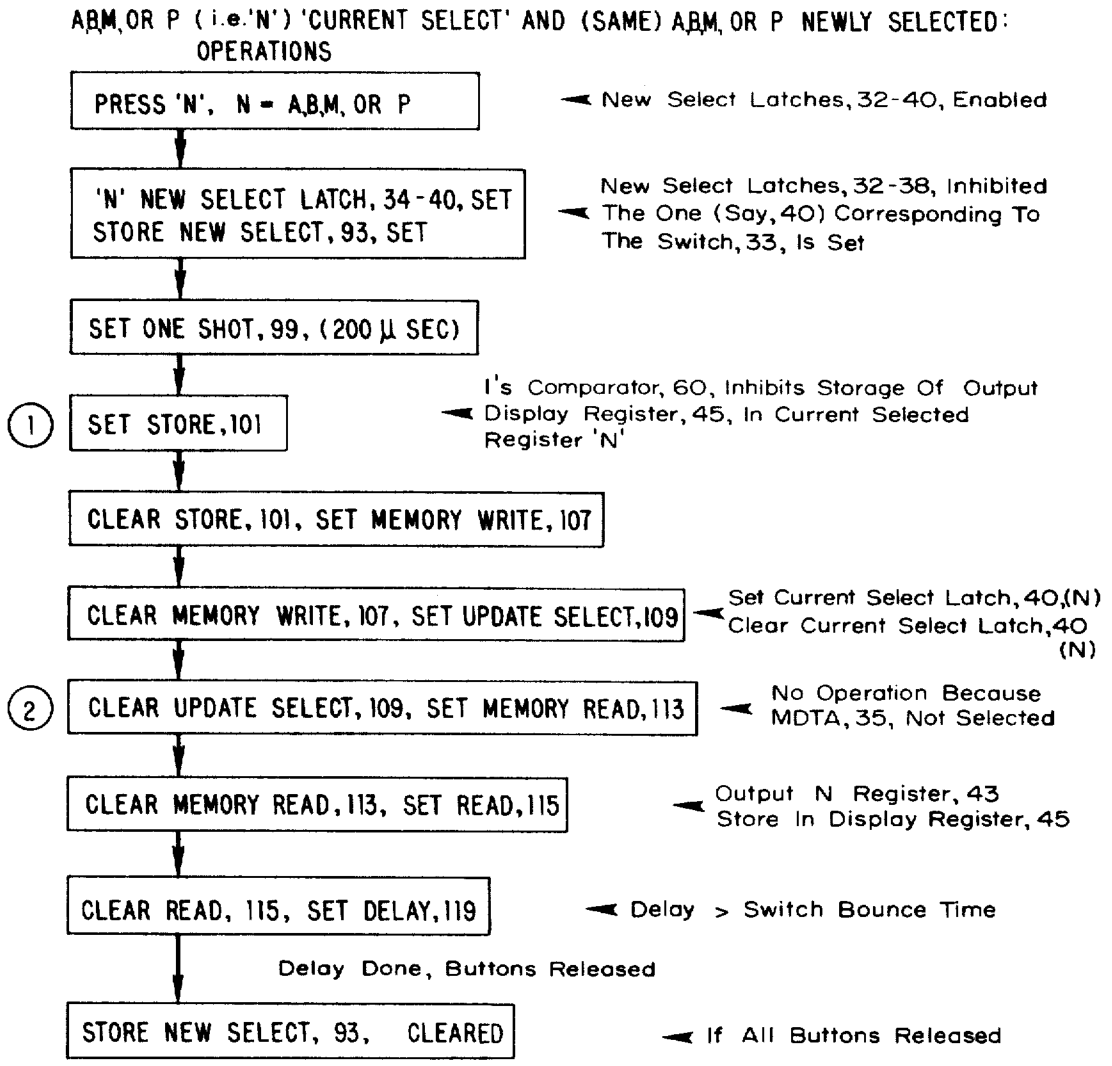
Figure 8:
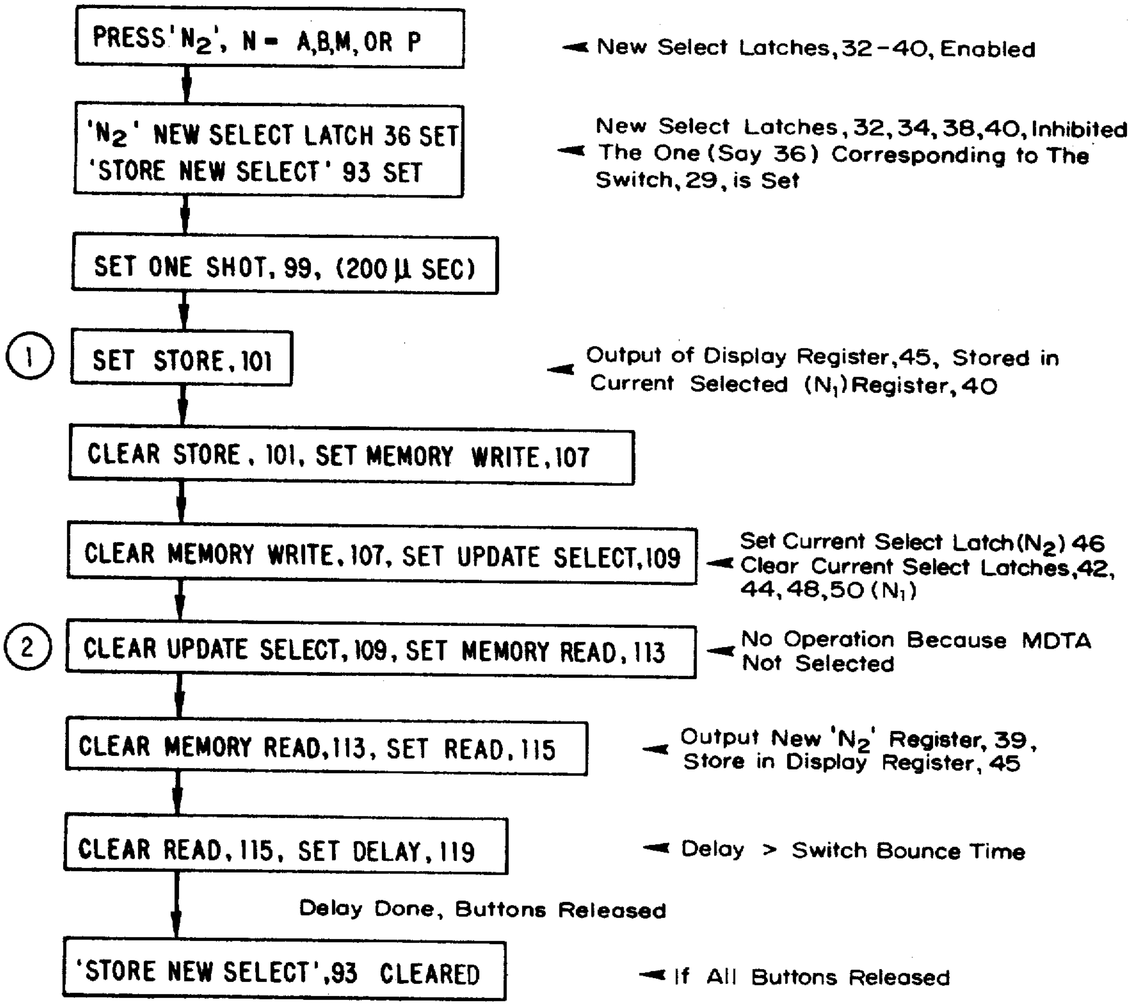

Referring now to the block diagrams of FIGS. 2 and 3, there are shown the schematic representations of switches 25, 27, 29, 31 and 33 which are associated with corresponding storage registers 35, 37, 39, 41 and 43, which storage registers may be included in a portion of a computer or other logical data manipulation apparatus that forms no part of the present invention. In addition, there is a display register 45 which includes a plurality of bit storage elements that correspond to the indicator-switches 9 on the panel array shown in FIG. 1. Each of the individual bit storage elements of display register 45 may be manipulated between its two operating states by the associated switch 9 of the front panel, and the logic states of each of the individual bit storage elements of the display register 45 are indicated by the associated indicator lamp 47. Each of the indicator lamps 47 is supplied by a driver amplifier 49 from the logic state of the associated bit storage element. The display register 45 and the registers 35–43 are coupled together through data bus 51 and associated gates for the transfer between registers of the data signals contained in the selected registers. For clarity, the AND gates associated with each register 35–45 are shown for only one bit storage element of each register. It should be understood, however, that each bit storage element of each register 35–45 includes an AND gate as shown associated with the register and connecting the particular bit of a register with the data bus in response to signals applied to the gates. Also, each register may be actuated to transfer data from storage by the individual bit storage elements to the data bus in response to signals applied through the gates 81–91 in response to signals applied thereto. Data transferred to a register from the data bus 51 are applied to each of the individual bit storage elements of a register by the input paths for each register, only one of which for each register is shown in the drawing for purposes of clarity.

Each of these registers is selected in response to actuation of the corresponding switch 25–33 through circuitry which is described as follows. A latching flip-flop 32, 34, 36, 38, 40 of conventional design (e.g., Texas Instruments No. 7475) associated with each register-selecting switch 25–33 receives the signal information in response to an actuated switch and retains the information through the interlock circuitry 30, thereby providing an indication of the newly selected register at the ouputs of the latch circuits 32–40. Similar latch circuits 42–50 are also provided and interconnected with the interlock circuit 30 to provide an indication of the last-selected or current-selected storage register. In the operation, as later described, the latch circuits associated with storage selection switches, say 25, thus operate essentially as two-bit shift registers providing information about the most recently selected storage circuits and about the last- or currently-selected storage register. The outputs of the current select registers (i.e., latch circuits 42–50) are applied to the associated gates of the registers as shown in FIG. 3. In addition, the outputs of the latch circuits 32–40 and the outputs of latch circuit 42–50 are applied to a 1's comparator circuit 60 that detects the condition of any corresponding pair of latch circuits in the same logic state. This indication is thus representative of the selection of a particular storage register and the reselection of the same register in the next operating sequence.

In operation, the transfer of data between selected registers progresses in sequence under the control of the interlock circuitry 30. A J-K flip-flop 93 receives the signal associated with a register selection switch 25–33 through NOR gate 95 which sets the flip-flop to its operating state. The same one of the switches 25–33 which was manually operated also actuates the corresponding new select latch circuit 32–40, which latch circuit is then set by the output of the J-K flip-flop 93 that is applied thereto over line 97. At the same time a monostable multivibrator circuit or one shot 99 is actuated to produce a pulse of fixed duration after which time the D flip-flop 101 is actuated to produce a control signal on line 103 which for no signal received from 1's comparator circuit 60 produces an output on the store line 105 at the output of gate 107. Also, the transition and operating states of the D flip-flop 101 sets the J-K flip-flop 107 which in the absence of any memory operations also triggers the D flip-flop 109. The output 111 of this flip-flop 109 triggers the latch circuits 42–50 to accept the data signal from the latch circuits 32–40 such that the latch circuits 42–50 are updated to the condition previously selected by the switches 25–33. At the same time, flip-flop 109 also actuates J-K flip-flop 113 which, in the absence of memory operations, also triggers the D flip-flop 115 to produce the read output on line 117. The read output on line 117 also actuates the delay network 119, the output of which is applied to the J-K flip-flop 93 to reset the flip-flop and to ready the interlock circuit 30 for the next switch actuation. The operation of the flip-flops in the interlock circuit 30 may be controlled by and synchronized to the input clock pulses from clock source 121.

When memory operations are involved, an operator may, for example, select the M register 41 by actuating the corresponding register selection switch 31. The address data stored in the M register is tranferred to the display register 45 where the individual bits of the display register may be independently manipulated by switches 9 to introduce a selected address in the array of data bits. Thereafter, the operator actuates the memory data switch 25 which transfers the contents of the memory array 129 at the particular address stored in the M register and displays it in the display register 45. There, the data may be modified by actuating selected ones of the switches 9. Thereafter, actuating another switch to select a register or to select a function thereby tranfers the data in the display register 45 to the T register 35. The data in the T register is thereafter transferred to the particular memory address stored in the M register. In each such operation data stored in the display register 45 is first transferred to the last-selected register and then the data stored in the newly selected register is transferred therefrom to the display register 45. In this way, data may be temporarily modified while being displayed in the display register without altering the contents of the storage register. Thus, in the operation of displaying the contents of memory, the operator selects Memory 31 and sets the desired memory address via switches 9. Then, by selecting Memory Data (MDTA) 25, the contents of the memory at the address selected is displayed in the indicators of switches 9. The contents of memory at an address several address numbers away from the address selected by switches 9 may be displayed simply by actuating the Increment M or Decrement M switches the desired number of times to step to the new, desired memory address. To load the memory at the selected address, the contents displayed in the display register may be changed via the switches 9 to be entered into the selected memory address upon selecting another register or another function. say The five conditions under which the circuit of the present invention operates are as follows: If memory data (T register 35) was the last-selected register and any other register 37–43 is selected, then upon actuating the corresponding switch, say 29, the newly selected register latch 36 is enabled and is set to the new logic condition associated with the switch. A time delay later, the store flip-flop 101 is set and this causes the data displayed in the display register 45 to be transferred out of the bit storage elements of the register through the gate 61 via the data bus 51 to the inputs of the T register 35 (previously selected register) through the inputs 72. The previously selected T register (memory data) actuates the gate 83 to introduce the data on data bus 51 into the T register. On the next clock pulse, the D flip-flop 101 is cleared and this resets the memory write flip-flop 107. The memory write flip-flop 107 thus produces an output from gate 123 and this initiates the transfer of data from the T register via the connections lines 125 into the memory address indicated by the M register 41. The memory control logic 127 associated with the memory array 129 produces a memory read done signal on line 131 when the transfer process is completed and this operates through the memory operation gates 133 to reset the memory write flip-flop 107 and thereby actuate the D flip-flop 109. This flip-flop enables the corresponding latch circuit 46 to clear the memory data last selection and to accept the new register selection input from the latch flip-flop 32–40 associated with the selected register.

In order to illustrate the operation of the present invention, these five general cases involved are listed and illustrated in FIGS. 4–8 as follows:

1. The T register (or Memory Data or MDTA) 35 currently selected, and the A, B, M or P register 37–43 newly selected;

2. The T register 35 currently selected, and the T register newly selected;

3. The A, B, M or P register 37–43 currently selected, and the T register 35 newly selected;

4. The A, B, M or P register 37–43 currently selected, and the (same) A, B, M or P register 37–43 newly selected;

5. The A, B, M or P register 37–43 currently selected, and the (different) A, B, M or P register 37–43 newly selected.

Operations of the present circuitry in the manner thus described and illustrated enable the contents of a selected storage register to be displayed temporarily and altered prior to transfer into a selected register.

I claim:

1. Digital data apparatus including a plurality of storage registers and comprising:

a plurality of bit storage elements, each operable in either of two logic operating states;

a switch for each bit storage element connected thereto to selectively alter the operating state of the associated bit storage element;

display means coupled to said bit storage elements for indicating the operating states thereof;

a pair of coupled bistate elements for each of the storage registers of the apparatus, each of said bistate elements being operable in either one of two logic states;

manually-manipulatable switching means for each of the storage registers of the apparatus coupled to at least one of the pair of bistate elements to operate said bistate elements sequentially in a given logic state in response to successive manipulations of the switching means for representing the last-selected storage register and the newly selected storage register;

indicator means coupled to said switching means for each of the storage registers for indicating the operating logic states of a bistate element of each of said switching means;

transfer gates connected to the storage registers and to the plurality of bit storage elements for selectively transferring data signals indicative of the logic states of the elements and registers between the bit storage elements and a selected storage register; and circuit means coupling the pairs of bistate elements to said transfer gates for controlling the transfer of data signals therethrough between the bit storage elements and the storage registers selected in response to the logic state of at least one bistate element associated with the switching means for a selected storage register, said circuit means including coupling circuitry to at least the bistate elements of the switching means for two selected registers to control the transfer of data signals from the plurality of bit storage elements to the last-selected storage register and to transfer data signals into the bit storage elements from a different, newly selected register in response to manual manipulation of the switching means for said newly selected register.

2. Digital data apparatus as in claim 1 wherein said circuit means includes control circuitry connected to transfer data signals to the plurality of bit storage elements from a storage register represented by the last-selected storage register logic state of a bistate element of the switching means for such storage register in response to manual manipulation of such switching means that establishes a logic state in one of the pair of bistate elements of such switching means which is indicative of the newly selected storage register being the same as the last-selected storage register.

3. Digital data apparatus as in claim 1 wherein said indicator means includes a visual display element for each of said switching means connected to one of the pair of bistate elements associated with said switching means for controlling the visual indication provided thereby in response to the logic operating state representative of the newly selected storage register.

* * * * *